United States Patent
Hiraoka et al.

(10) Patent No.: US 7,172,275 B2
(45) Date of Patent: Feb. 6, 2007

(54) INK SET FOR INK JET RECORDING INCLUDING POLYVALENT METAL IONS AND COMPOUND INACTIVATING THE SAME

(75) Inventors: Eisuke Hiraoka, Ebina (JP); Toshitake Yui, Ebina (JP); Ken Hashimoto, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 258 days.

(21) Appl. No.: 10/863,387

(22) Filed: Jun. 9, 2004

(65) Prior Publication Data

US 2004/0252172 A1    Dec. 16, 2004

(30) Foreign Application Priority Data

Jun. 12, 2003   (JP) .............................. 2003-167425

(51) Int. Cl.
  *B41J 2/17* (2006.01)
(52) U.S. Cl. ..................................................... 347/100
(58) Field of Classification Search ................. 347/100
  See application file for complete search history.

(56) References Cited

U.S. PATENT DOCUMENTS

| 5,181,045 | A | | 1/1993 | Shields et al. |
|---|---|---|---|---|
| 5,198,023 | A | | 3/1993 | Stoffel |
| 5,320,668 | A | | 6/1994 | Shields et al. |
| 6,420,083 | B1 | * | 7/2002 | Kawamura ................ 430/270.1 |
| 2002/0093557 | A1 | * | 7/2002 | Takuhara et al. ........... 347/100 |

FOREIGN PATENT DOCUMENTS

| JP | A 5-208548 | 8/1993 |
|---|---|---|
| JP | A 6-57192 | 3/1994 |
| JP | A 7-1837 | 1/1995 |
| JP | A 2001-152059 | 6/2001 |

\* cited by examiner

*Primary Examiner*—Manish S. Shah
*Assistant Examiner*—Laura E Martin
(74) *Attorney, Agent, or Firm*—Oliff & Berridge, PLC

(57) ABSTRACT

The present invention provides an ink set for ink jet recording comprising: an ink which contains: water; a colorant; a water-soluble organic solvent; polyvalent metal ions; and compound (A) which is intrinsically capable of substantially inactivating the polyvalent metal ions, and a liquid composition is of a pH in which the polyvalent metal ions in the ink can be substantially activated. The pH of the ink is within a range in which compound (A) keeps the polyvalent metal ions substantially in an inactive state. The invention also provides an ink jet recording method which uses such an ink set.

19 Claims, No Drawings

INK SET FOR INK JET RECORDING INCLUDING POLYVALENT METAL IONS AND COMPOUND INACTIVATING THE SAME

CROSS-REFERENCE TO RELATED APPLICATION

This application claims priority under 35 USC 119 from Japanese Patent Application No. 2003-167425, the disclosure of which is incorporated by reference herein.

BACKGROUND OF THE INVENTION

1. Field of the Invention

The present invention relates to a novel ink set for ink jet recording, and to an ink jet recording method which uses the same.

2. Description of Related Art

A recording apparatus for an ink jet method ejects a liquid or a melting solid ink from an outlet such as a nozzle, a slit or a porous film, and records images on an object such as paper, cloth or a film. This recording apparatus has been given considerable attention because advantages such as compactness, moderateness of price and quietness. Various methods have been proposed as methods for ejecting the ink, including a so-called charge control method, a so-called drop on-demand method (a pressure pulse method), and a so-called thermal ink jet method. The charge control method ejects the ink by means of electrostatically attractive force. The drop on-demand method ejects the ink by using the vibration pressure of a piezo element. The thermal ink jet method ejects the ink by using the pressure caused by forming bubbles and developing them at a high temperature. Images of extremely high definition can be obtained by means of these methods.

The ink used in an ink jet recording apparatus is mainly composed of a solvent, a colorant and an additive. The following properties are among those required of an ink; (1) a uniform image which has high resolution and high density should be obtained on the paper without either color bleeding or fogging; (2) clogging caused by the drying of ink in a nozzle tip should be avoided, and ejection response and ejection stability always be satisfactory; (3) the drying characteristics of the ink on paper should be high; and (4) the fastness of images should be high.

Furthermore, high image density, prevention of color spreading in images, and prevention of bleeding between colors are all important factors which need to be taken into account in order to obtain full-color printing which has high definition.

A combination of a first ink containing a dye responsive to a specific pH and a second ink of a pH in which the dye can be precipitated has been proposed for the purpose (for instance, see Japanese Patent Application Laid-Open (JP-A) No. 05-208548). A combination of a first pigment ink containing a dispersing agent responsive to a specific pH, and a second ink of a pH for precipitating the pigment, has been proposed (for instance, see JP-A No. 07-1837). However, it has not been easy to obtain high image density by either of the above methods, and attempts to reduce bleeding between colors have not produced the desired improvements in results.

Among other methods, an ink set obtained by combining a black ink using an anionic dye with a yellow ink containing a cationic dye and a polyvalent precipitant has been proposed (for instance, see JP-A No. 06-57192). However problems have occurred such as nozzle clogging and inadequate ejection stability. A combination has also been proposed of a black ink using a pigment, and color inks, one of which includes a dye or an additive instabilizing the dispersing stability of the pigment of the black ink (for instance, see JP-A No. 2001-152059). However bleeding between colors has not been sufficiently restrained by this method, either.

Thus, a color ink set for ink jet recording has so far yet to be obtained which has high image density; suppresses both color spreading in images and bleeding between colors; can form images of excellent quality; and has an excellent ejection stability.

Therefore, there is a need for an ink set for ink jet recording which can serve high image density in full-color printing which has high definition, suppresses both color spreading in images and bleeding between colors, and also has excellent ejection stability. In addition, there is a need for an ink jet recording method which uses such an ink set and such an ink jet recording apparatus.

SUMMARY OF THE INVENTION

The inventors of the invention have conducted earnest studies. As a result, the inventors have found that the above need can be satisfied by an ink set for ink jet recording which includes an ink containing at least water, a colorant, and a water-soluble organic solvent, which further includes polyvalent metal ions cohering the colorant particles and a compound (compound (A)) intrinsically capable of substantially inactivating the polyvalent metal ions to make the ink substantially inactive, which includes a second liquid, and in which the polyvalent metal ions are substantially activated at the time of image formation when brought into contact with the second liquid. Then, the invention has been accomplished based on this finding.

A first aspect of the invention provides an ink set for ink jet recording comprising: an ink which contains: water; a colorant; a water-soluble organic solvent; polyvalent metal ions; and compound (A) which is intrinsically capable of substantially inactivating the polyvalent metal ions, wherein the pH of the ink is within a range in which compound (A) keeps the polyvalent metal ions substantially in an inactive state, and a liquid composition of a pH in which the polyvalent metal ions in the ink can be substantially activated.

A second aspect of the invention provides an ink set for ink jet recording comprising: an ink which contains: water; a pigment which can be self-dispersed in water; a water-soluble organic solvent; polyvalent metal ions; and compound (A) having a reaction site reacting with the polyvalent metal ions, wherein the pH of the ink is in a range of 8.0 to 12.0, and a complex compound is formed by the polyvalent metal ions and the reaction site; and a liquid composition which can substantially activate the polyvalent metal ions in the ink and the pH of which liquid composition is in a range of 4.0 to 6.0.

A third aspect of the invention provides an ink jet recording method which uses an ink set comprising: an ink which contains: water; a colorant; a water-soluble organic solvent; polyvalent metal ions; and compound (A) which is intrinsically capable of substantially inactivating the polyvalent metal ions, wherein the pH of the ink is within a range in which compound (A) keeps the polyvalent metal ions substantially in an inactive state; and a liquid composition of a pH in which the polyvalent metal ions in the ink can be substantially activated, wherein the ink and the liquid composition are applied onto a recording medium in positions in contact with each other, and images are thereby formed.

In the case of an image forming method using the ink set for ink jet recording of the invention containing the ink and the liquid composition which does not contain a colorant, the liquid composition is applied to portions of a recording medium on which an image is to be formed with the ink before or after the ink is applied to the portions. Then, the ink is brought into contact with the liquid composition, and thereby the polyvalent metal ions which can cohere the colorant particles are activated and promptly cause the aggregation of the colorant. Therefore, a high image density can be obtained. Further, an image of high definition can be obtained without generation of color spreading in images and bleeding between colors. Thing which is applied first may be the ink or the liquid composition. However it is preferable that the liquid composition is applied before application of the ink in view of formation of images of high definition.

The amount of the liquid composition applied to the printing area of the ink is preferably less than the printing amount of the ink per printing area in view of the drying characteristics of the ink.

The liquid composition may contain a colorant of hue different from that of the ink and may be another ink composition. When one droplet of an ink of a conventional ink set and one droplet of another ink of the ink set are applied onto a recording medium in order to from one dot of the ink and one dot of the another ink on the recording medium in positions adjoining each other and are brought into contact with each other on the recording medium, color mixing and bleeding between colors often occur. Meanwhile, when one dot of the ink contained in the ink set of the invention and one dot of the liquid composition contained in the ink set of the invention are applied to a printing medium in positions adjoining each other, contact of the droplets which form the two dots does not cause color mixing and bleeding between colors.

The reason for this is believed to be as follows. The ink set for ink jet recording includes the polyvalent metal ions, which are in an inactive state due to the compound (A). Here, the inactive state means a state in which compound (A) prevents the polyvalent metal ions from reacting with other elements in the ink. For instance, the function of such compound (A) is that compound (A) forms with the polyvalent metal ions a complex compound which can be stably dispersed or dissolved in the ink. Alternatively, compound (A) can be a carrier, such as porous fine particles, which adsorbs the polyvalent metal ions to make and keep the polyvalent metal ions inactive.

When compound (A) can react with the polyvalent metal ions, an example of a state in which the polyvalent metal ions and compound (A) are dissolved in the ink will be described. When the polyvalent metal ions are $M^{m+}$ (m=2 to 3), and a part of compound (A) (site of compound (A) which reacts with the polyvalent metal ions) is $Y^{a-}$ (a=1 to 6), the state in which the polyvalent metal ions are substantially in an inactive state is represented by $MY^{m-ax}$ of the following formula (I), which usually forms a complex compound. In a pH range in which the polyvalent metal ions are substantially kept in the inactive state, the reaction of formula (I) shifts to the right ($MY^{m-ax}$) by 100%, and the polyvalent metal ions are kept in the inactive state.

$$M^{m+} + xY^{a-} \rightleftarrows MY^{m-ax} \quad (1)$$

In formula (I), "m−ax" is less than or equal to −1, and x represents an integer which satisfies the relationship of m−ax≦−1.

In the ink jet recording method which uses the ink set of the invention, the ink and the liquid composition are applied to a recording medium in positions in contact with each other, and an image is thereby formed. Here, "application of the ink and the liquid composition in positions in contact with each other" contains applying them sequentially or almost simultaneously onto the same area such that the ink and the liquid composition overlap, and applying them onto a recording medium such that the ink and the liquid composition adjoin each other.

When one dot of the ink of the ink set of the invention and one dot of the liquid composition of the ink set are applied to a recording medium such that the dots overlap, the pH of the ink is changed by the liquid composition on the interface between the ink and the liquid composition at the time that the droplet of the ink and the droplet of the liquid composition are brought into contact with each other. This change causes the reaction of formula (I) to shift to the left, and causes $MY^{m-ax}$ to be divided into $M^{m+}$ and $Y^{a-}$. The activated polyvalent metal ions $M^{m+}$ cause the colorant particles contained in the ink to aggregate and precipitate. Since the above reaction takes place on the surface and surface portion of the recording medium, permeation and diffusion of the colorant of the ink are suppressed, and the ink remains in the portion in the vicinity of the recording medium surface. Therefore, color spreading in images can be prevented and a high image density can be obtained.

When the liquid composition of a color ink set of the invention includes a colorant and serves as another ink, and one dot of the ink and one dot of the liquid composition are applied to a recording medium such that they adjoin each other, a similar reaction takes place at the time that the droplets of the ink and the liquid composition are brought into contact with each other, but bleeding between colors is effectively prevented. The reason for this is believed to be that the aggregation of the colorant particles is caused on the contact interface between the color inks.

In the above case, the reaction takes place on the surface and surface portion of the recording medium, and permeation and diffusion of the colorant particles contained in the ink are suppressed, and the ink remains in the portion in the vicinity of the recording medium surface, by applying the liquid composition containing a colorant onto the printing area of the ink before or after applying the ink. Thereby, color spreading in images can be prevented and a high image density can be obtained.

It is preferable that the amount of the liquid composition applied to the printing area of the ink is less than that of the ink per the printing area in view of the drying characteristics of the ink or color reproducibility.

DETAILED DESCRIPTION OF THE INVENTION

Hereinafter, the invention will be described in detail.

An ink set for ink jet recording of the invention includes an ink. The ink includes water, a colorant, a water-soluble organic solvent, polyvalent metal ions and a compound which substantially inactivates the polyvalent metal ions [hereinafter, the compound is sometimes called "compound (A)" in the invention].

Examples of the polyvalent metal ions include, but are not limited to, $Mg^{2+}$, $Ca^{2+}$, $Cu^{2+}$, $Co^{2+}$, $Zn^{2+}$, $Ni^{2+}$, $Fe^{2+}$, $La^{3+}$, $Nd^{3+}$, $Y^{3+}$ and $Al^{3+}$. Among these, $Mg^{2+}$ and $Ca^{2+}$ are especially preferable in view of the interaction with preferable examples of compound (A) described later in detail and the suppressing effect of bleeding between colors.

The compound (compound (A)] which substantially inactivates the polyvalent metal ions may be a compound which substantially inactivates the polyvalent metal ions, that is, keeps the polyvalent metal ions in an inactive state where the polyvalent metal ions do not react with other elements in the ink. Here, the inactive state refers to the state where compound (A) keeps the polyvalent metal ions from reacting with other elements in the ink. For instance, the inactive state refers to the state where the polyvalent metal ions react with compound (A), and the material generated from the reaction is stably dispersed or dissolved in the ink. The material is preferably dissolved in the ink. In another embodiment, it is preferable that compound (A) which is a carrier such as porous fine particles adsorbs the polyvalent metal ions, and that the fine particles are stably dispersed in the ink.

Preferable examples of compound (A) include a compound which forms, together with the polyvalent metal ions, a complex compound. The reaction of such a compound in the ink will be described.

Given the polyvalent metal ions are $M^{m+}$ (m=2 to 3), and a part of compound (A) (a reactive site reacting with the polyvalent metal ions) is $Y^{a-}$ (a=1 to 6) in a state where the material generated from the reaction between the polyvalent metal ions and compound (A) dissolves in the ink, the polyvalent metal ions and compound (A) are more preferably dissolved in the state of $MY^{m-ax}$ (m−ax≦−1) in the ink as shown in the following formula (I).

$$M^{m+} + xY^{a-} \rightleftarrows MY^{m-ax} \quad (1)$$

In formula (I), "m−ax" is less than or equal to −1, and x represents an integer which satisfies the relationship of m−ax≦−1.

The compound which has the following anionic functional group in the ink and can react with the polyvalent metal ions to form a complex compound is preferable as compound (A) which can react with the polyvalent metal ions. Examples of $Y^{3-}$ which is a part of compound (A) in formula (I) include, but are not limited to, $Cl^-$, $CN^-$, $NO_3^-$, $SO_4^{2-}$, $NO_2^-$, $OH^-$, $CO_3^{2-}$, $O^{2-}$ and structures represented by the following formulae (1) to (13).

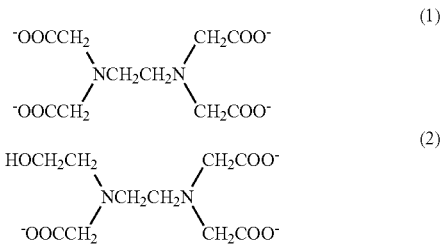

-continued

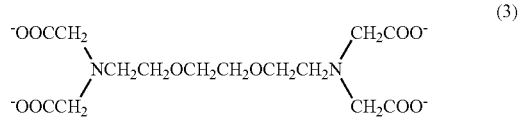

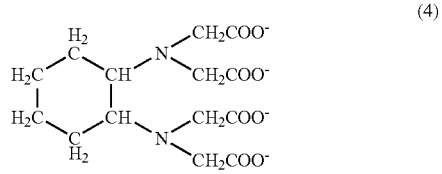

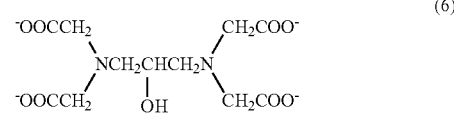

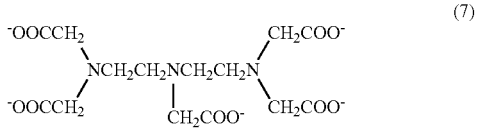

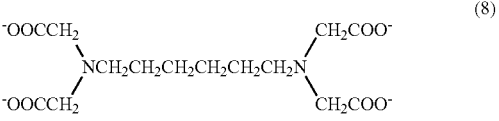

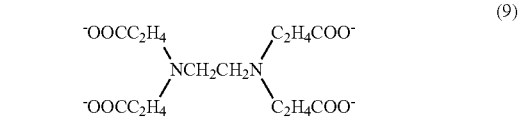

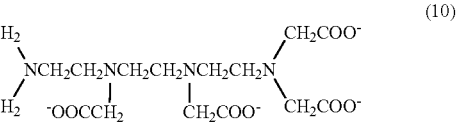

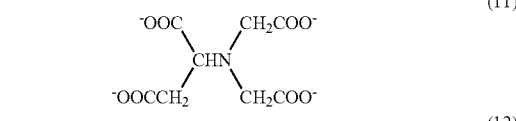

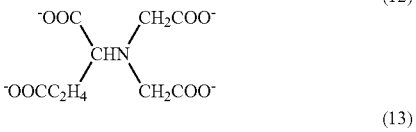

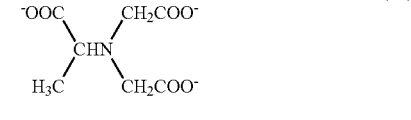

Among these, the compounds represented by formulae (1), (3), (6) and (8) are especially preferable in view of the interaction with the polyvalent metal ions, suppression of bleeding between colors and ejection stability.

The polyvalent metal ions and compound (A) may be separately added to a system. Alternatively, after the polyvalent metal ions and compound (A) have become $MY^{m-ax}$, for instance, the polyvalent metal ions and compound (A) have formed a complex, $MY^{m-ax}$ may be added to a system.

In the latter case, for instance, the calculated amount of a polyvalent metal carbonate is added to the suspension of free acid ($H_aY$) of compound (A), and the resultant mixture is heated to cause the polyvalent metal carbonate to completely dissolve in the suspension. Thereafter, the calculated amount of sodium hydroxide is added to the resultant solution, and the resulting mixture is concentrated to precipitate crystals. Thus, $Na_{ax-m}MY^{m-ax}$ can be obtained. The ink of the invention can be obtained by preparing a solution or a dispersion of $Na_{ax-m}MY^{m-ax}$ having a predetermined pH and adding the solution or the dispersion to a system.

The amount of the polyvalent metal ions contained in the ink may be properly determined in accordance with the relationship between the polyvalent metal ions and the compound (A), and/or the relationship between the polyvalent metal ions and the colorant contained in the ink. The amount of the polyvalent metal ions is preferably in the range of about 0.01 to about 5.0% by mass with respect to the total amount of the ink.

The amount of compound (A) contained in the ink may be properly determined in accordance with the relationship between compound (A) and the polyvalent metal ions, and/or the relationship between compound (A) and the colorant contained in the ink. Given the mole of the polyvalent metal ions is 1, it is necessary that the amount of compound (A) be sufficient to change all the polyvalent metal ions contained in the ink into $MY^{m-ax}$. The amount of compound (A) is preferably in the range of about 0.01 to about 5.0% by mass with respect to the total amount of the ink.

The pH of the ink is within the range in which compound (A) keeps the polyvalent metal ions substantially in the inactive state. That is, according to the above specific example, the reaction of formula (I) shifts to the right. Specifically, the pH of the ink is preferably in the range of about 8.0 to about 12.0. However, the optimal range depends on a combination of the polyvalent metal ions and compound (A) and may be more or less different within the range.

For instance, the pH of the ink is preferable in the range of about 8.5 to about 11 for a combination of $Mg^{2+}$ and formula (1). The range of about 9.0 to about 10.5 is more preferable in view of stable maintenance of the inactive state. When the pH is lower than 8.5, the compound of formula (1) cannot keep $Mg^{2+}$ in the inactive state and therefore colorant particles undesirably tends to aggregate, which tends to result in ejection failure and nozzle clogging. When the pH is higher than 1, $Mg^{2+}$ causes hydroxide to precipitate, resulting in ejection failure and nozzle clogging.

On the other hand, the pH of the ink is preferably in the range of about 8.0 to about 12.0 for a combination of $Ca^{2+}$ and formula (1). The pH of the ink is more preferably in the range of about 8.5 to about 11.0 in view of maintenance of the inactive state and suppressing of bleeding between colors. When the pH is lower than 8.0, the compound of formula (1) cannot keep $Ca^{2+}$ in the inactive state, resulting in ejection failure and nozzle clogging. When the pH is more than 12, such an ink may chemically corrosive a member that is brought into contact with the ink.

The liquid composition of an ink set for ink jet recording of the invention has a pH which can substantially activate the polyvalent metal ions. The pH of the liquid composition is preferably in the range of about 4.0 to about 7.0, and, in view of the suppressing of bleeding between colors, more preferably in the range of about 4.0 to about 6.0.

In the ink set for ink jet recording of the invention, it is important that the pHs of the ink and liquid composition are kept at predetermined values. A pH controlling agent is used to adjust the pHs of the ink and liquid composition.

Examples of the pH controlling agent include acids such as hydrochloric acid, sulfuric acid, nitric acid, acetic acid, citric acid, oxalic acid, malonic acid, boric acid, phosphoric acid and phosphorous acid; bases such as sodium hydroxide, potassium hydroxide, lithium hydroxide and ammonia; and various buffers such as good buffers including phosphate, oxalate, amic acid salt, aminoethanesulfonate, N,N-bis(2-hydroxy ethyl)-2-aminoethanesulfonate, acetamidoglycine, N-carbamoylmethylimino diacetic acid, N-tris(hydroxy methyl)methyl-3-aminopropanesulfonic acid and N,N-bis (2-hydroxy ethyl)glycine.

The amount of the pH controlling agent added is suitably selected. It is preferable that the amount of the pH controlling agent in the ink is sufficient for compound (A) to keep the polyvalent metal ions in an inactive state. In order to keep the pH of the ink in the range of about 8.0 to about 12.0, the amount of the pH controlling agent is preferably in the range of about 0.03 to about 8% by mass, and more preferably in the range of about 0.05 to about 3% by mass.

The pH of the liquid composition is preferably kept in the range of about 4.0 to about 7.0. The amount of the liquid composition is preferably such that the liquid composition has buffer capacity by which the liquid composition can substantially activate the polyvalent metal ions in the ink. The amount of the liquid composition is preferably in the range of about 0.03 to about 8% by mass, and more preferably in the range of about 0.05 to about 3% by mass.

In the ink set for ink jet recording of the invention, an ink serving as a first element includes a colorant and a liquid composition serving as a second element may also contain a colorant.

The colorant used in the invention may be a pigment, a water-soluble dye, an oil emulsion colored by an oil-soluble dye or a pigment, a colored polymer, or a wax. A pigment or a water-soluble dye is preferable.

Both an organic pigment and an inorganic pigment can be used as a pigment.

A black pigment can be a carbon black pigment such as furnace black, lamp black, acetylene black or channel black. Specific examples (Hereinafter, when an example is a marketed product, it is described as a trade name) of the black pigment include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, Raven 1060 (manufactured by Columbian Chemicals Company), Regal 400R, Regal 330R, Regal 660R, Mogul L, Black Pearls L, Monarch 700, Monarch 800, Monarch 880, Monarch 900, Monarch 1000, Monarch 1100, Monarch 1300, and Monarch 1400 (manufactured by Cabot Corporation); Color Black FW1, Color BlackFW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (manufactured by Degussa Co.); No. 25, No. 33, No. 40, No. 47, No. 52, No. 900, No. 2300, MCF-88, MA600, MA7, MA8 and MA100 (manufactured by Mitsubishi Chemical Corporation).

When the ink in the invention is a black ink, the ink can include not only a black pigment but also any of pigments having three primary colors which are cyan, magenta and yellow, pigments having a specific color such as red, green, blue, brown and white, pigment having metallic luster such as gold and silver, colorless or hypochromic fillers, and plastic pigments.

Examples of pigments having hue other than black will be described hereinafter. Specific examples of cyan pigments include C. I. Pigment Blue -1, -2, -3, -15, -15:1, -15:2, -15:3, -15:4, -16, -22, and -60.

Specific examples of magenta pigments include C. I. Pigment Red -5, -7, -12, -48, -48:1, -57, -112, -122, -123, -146, -168, -184 and -202.

Specific examples of yellow pigments include C. I. Pigment Yellow -1, -2, -3, -12, -13, -14, -16, -17, -73, -74, -75, -83, -93, -95, -97, -98, -114, -128, -129, -138, -151 and -154.

It is preferable to use a pigment which can be self-dispersed in water as a pigment serving as a colorant used in the ink set for ink jet recording of the invention in view of ejection stability. Since the pigment which can be self-dispersed in water has a surface functional group chemically bonding thereto, the pigment easily coexists with the polyvalent metal ions and compound (A) in the ink, and the influence of the pigment to dispersion stability is small.

In the invention, the "pigment which can be self-dispersed in water" refers to a pigment which satisfies a condition concerning the concentration of the pigment measured by the following procedure, has at least one water-soluble functional group on the surface thereof, and can be stably dispersed in water without a polymer dispersing agent.

In measuring the concentration of a pigment, the pigment is first added to water such that the amount of water is 95% by mass and that the amount of the pigment is 5% by mass. The pigment is then dispersed in water for 5 minutes with a high-pressure homogenizer, and the resultant dispersion liquid is left in a glass bottle for 24 hours. Next, the supernatant is taken from the resultant dispersion liquid of the pigment such that the amount of the supernatant is one third of the total volume of the dispersion liquid. The concentration of the pigment in the supernatant of the dispersion liquid is measured. When the measured concentration of the pigment is 98% or more with respect to the concentration of the pigment in the dispersion liquid immediately after dispersion, the pigment is regarded as self-dispersed in water. Here, a method for measuring the concentration of the pigment is not limited to a particular method. Examples of the method include a method in which a sample is dried and then the content of the resultant solid is measured, and a method in which a sample is diluted to a suitable concentration and the transmittance of the diluted sample is measured. Other methods for accurately measuring the concentration of the pigment can also be used, if any.

For instance, a commercially available self-dispersible pigment such as Cab-o-jet-200, Cab-o-jet 300 and IJX-55 manufactured by Cabot Corporation, Microjet Black CW-1 manufactured by Orient Chemical Industries, Ltd., a self-dispersible pigment manufactured by Nippon Shokubai Co., Ltd., may be used as the pigment which can be self-dispersed in water. These commercially available self-dispersible pigments have a self-dispersible index of 100%. For instance, the pigment which can be self-dispersed in water is manufactured by subjecting an ordinary pigment to a surface modification treatment such as an acid and/or base treatment, a coupling agent treatment, a polymer graft treatment, a plasma treatment, or an oxidation/reduction treatment. Therefore, a pigment to which the self-dispersibility is applied by subjecting a general pigment to the surface modification treatment may be used.

Next, a dye used as a colorant will be described.

Specific examples of water-soluble dye include C. I. Direct Black -2, -4, -9, -11, -17, -19, -22, -32, -80, -151, -154, -168, -171, -194 and -195; C. I. Direct Blue -1, -2, -6, -8, -22, -34, -70, -71, -76, -78, -86, -112, -142, -165, -199, -200, -201, -202, -203, -207, -218, -236, -287, and -307; C. I. Direct Red-1, -2, -4, -8, -9, -11, -13, -15, -20, -28, -31, -33, -37, -39, -51, -59, -62, -63, -73, -75, -80, -81, -83, -87, -90, -94, -95, -99, -101, -110, -189, and -227; C. I. Direct Violet-1, -7, -9, -12, -35, -47, -51, -66, -93, -95, -98, -99, -100, -106, and -107; C. I. Direct Yellow-1, -2, -4, -8, -11, -12, -26, -27, -28, -33, -34, -41, -44, -48, -58, -86, -87, -88, -132, -142, -144, and -173; C. I. Food Black -1, and -2; C. I. Acid Black-1, -2, -7, -16, -24, -26, -28, -31, -48, -52, -63, -107, -112, -118, -119, -121, -156, -172, -194, and -208; C. I. Acid Blue-1, -7, -9, -15, -22, -23, -27, -29, -40, -43, -55, -59, -62, -78, -80, -81, -83, -90, -102, -104, -111, -185, -249, and -254; C. I. Acid Red -1, -4, -8, -13, -14, -15, -18, -21, -26, -35, -37, -52, -110, -144, -180, -249, -257, and -289; C. I. Acid Yellow -1, -3, -4, -7, -11, -12, -13, -14, -18, -19, -23, -25, -34, -38, -41, -42, -44, -53, -55, -61, -71, -76, -78, -79, and -122; C. I. Reactive Black -1, -4, -5, -8, -13, -14, -27, -30, -31, -34, -39, -43, -45, and -46; C. I. Reactive Blue -3, -4, -5, -13, -14, -15, -18, -19, -21, -25, -26, -27, -28, -38, -41, -49, -59, -71, -77, -104, -109, -113, -114, -120, -140, -160, -163, -171, -172, -194, -198, -203, -221, -222, and -231; C. I. Reactive Red -1, -2, -3, -11, -12, -21, -22, -23, -24, -29, -31, -33, -35, -40, -43, -45, -49, -58, -74, -76, -101, -106, -120, -141, -147, -152, -159, -180, -194, -195, -198, -222, -227, and -250; and C. I. Reactive Yellow -1, -2, -3, -4, -7, -15, -17, -18, -22, -23, -24, -25, -27, -37, -42, -44, -46, -77, -81, -84, -85, -86, -105, -116, -125, -135, -145, -154, -160, and -167.

Among these, a colorant which can be stably dispersed or dissolved in a suitable liquid having a pH of about 8.0 to about 12 is preferably used in the ink. A colorant having at least one carboxylic acid functional group as a substituent and having the following relationship between the number of sulfonic acid groups and that of carboxylic acid groups is preferable, since it effectively prevents bleeding between colors.

(The Number of Sulfonic Acid Group)< (The Number of Carboxylic Acid Groups)

The content of the colorant contained in the ink is in the range of about 0.1 to about 10% by mass to the total amount of the ink, preferably in the range of about 1.0 to about 7.0% by mass, and more preferably in the range of about 1.0 to about 5.0% by mass.

When a liquid composition includes a colorant and is used as an ink, it is preferable that the colorant is stably dispersed or dissolved in a suitable liquid having a pH of about 4.0 to about 7.0. It is more preferable that the colorant has at least one sulfonic group as a substituent and does not contain a carboxylic acid group. The content of the colorant is in the range of about 0.1 to about 10% by mass to the total amount of the ink, preferably in the range of about 1.0 to about 7.0% by mass, and more preferably in the range of about 1.0 to about 5.0% by mass.

When a pigment which is not self-dispersible is used as the colorant of the ink (a first element), a polymer dispersing agent can be used to disperse the pigment in the ink. A known polymer surfactant and a water-soluble resin can be used as the polymer dispersing agent. However, a polymer dispersing agent having at least one carboxylic acid group as a substituent and satisfying the following relationship between the number of sulfonic acid groups and that of carboxylic acid groups is preferable, since it effectively prevents bleeding between colors.

(The Number of Sulfonic Acid Groups)<(The Number of Carboxylic Acid Groups)

The amount of the polymer dispersing agent added is preferably in the range of about 0.1 to about 3% by mass, and, in view of ejection stability, more preferably in the range of about 0.2 to about 2.0% by mass.

When the liquid composition includes as a colorant a pigment which is not a self-dispersible pigment, a polymer dispersing agent can be used to disperse the pigment in the liquid composition. A known polymer surfactant and a water-soluble resin can be used as the polymer dispersing agent. However, a polymer dispersing agent having at least one sulfonic acid group as a substituent and having no carboxylic acid group is more preferable.

The amount of the polymer dispersing agent added is preferably in the range of about 0.1 to about 3% by mass, and, in view of ejection stability, more preferably in the range of about 0.2 to about 2.0% by mass.

In the ink set of the invention, at least one water-soluble organic solvent is used to prepare the ink. The liquid composition may also contain a water-soluble organic solvent. In particular, when the liquid composition is used as an ink, the liquid composition preferably includes a water-soluble organic solvent.

The water-soluble solvent which can be used in the invention is preferably selected from polyvalent alcohols, polyvalent alcohol derivatives and polar solvents. When the water-soluble solvent is any of polyvalent alcohols, polyvalent alcohols derivatives, and polar solvents, the moisture of the resultant ink, and the solubility or dispersion stability of the colorant are good. Therefore, clogging can be prevented, and ejection stability of the ink for ink jet recording can be kept.

Ethylene glycol, diethylene glycol, triethylene glycol, polyethylene glycol, propylene glycol, butylene glycol, 1,5-pentanediol, glycerine, 2,2"-thiodiethanol and/or triethanolamine can be preferably used as the polyvalent alcohol.

Ethylene glycol monomethyl ether, ethylene glycol monobutyl ether, diethylene glycol monoethyl ether, diethylene glycol monobutyl ether, triethylene glycol monobutyl ether and/or propylene glycol monomethyl ether can be preferably used as the polyvalent alcohol derivative.

In the specification, the polar solvent refers to a solvent which has a large dipole moment or a large permittivity. For instance, N,N-dimethylformamide, 2-pyrrolidone and N-methyl-2-pyrrolidone, cyclohexylpyrrolidone, dimethyl sulfoxide, and/or sulfolane can be preferably used.

The ink and/or the liquid composition may contain a water-soluble organic solvent other than the above solvents. Examples thereof include alcohols such as ethanol, isopropanol, butanol and benzyl alcohol; and alkanolamines such as monoethanol amine, diethanol amine and triethanol amine.

In the invention, the total content of the water-soluble organic solvent(s) contained in the ink for ink jet recording is preferably in the range of about 3.0 to about 60.0% by mass. When the total content of the water-soluble organic solvent is less than 3.0% by mass, the ink for ink jet recording easily dries and the ink components easily precipitate, and ejection failure such as nozzle clogging is easily caused. On the other hand, when the total content of the water-soluble organic solvent is more than 60.0% by mass, the resultant ink does not easily fix on paper. In addition, since the viscosity of the ink is high, ejection failure is easily caused. The total content of the water-soluble organic solvent is preferably in the range of about 10.0 to about 40.0% by mass in view of well balance between prevention of nozzle clogging and ejection stability.

In the invention, the ink and/or the liquid composition may contain a surfactant.

Any surfactant can be effectively used as long as it has a hydrophilic portion and a hydrophobic portion in the molecular thereof. For instance, an anionic surfactant, a cationic surfactant, an amphoteric surfactant and/or a nonionic surfactant may be used. The polymer dispersing agent described above can also be used as a surfactant.

Alkylbenzenesulfonates, alkylphenylsulfonates, alkylnaphthalenesulfonates, higher fatty acid salts, sulfates of higher fatty acids, sulfonates of higher fatty acids, sulfates and/or sulfonates of higher alcohol ethers, higher alkyl sulfosuccinates, higher alkyl phosphates, and/or phosphates of higher alcohol ethylene oxide adducts can be used as the anionic surfactant. For instance, specific examples of the anionic surfactant include dodecylbenzenesulfonate, kelylbenzenesulfonate, isopropylnaphthalenesulfonate, monobutylphenylphenol monosulfonate, monobutylbiphenylsulfonate and dibutylphenylphenol disulfonate.

Examples of the nonionic surfactant include polypropylene glycol ethylene oxide adduct, polyoxyethylene nonylphenyl ether, polyoxyethylene octylphenyl ether, polyoxyethylene dodecyl phenyl ether, polyoxyethylene alkyl ether, polyoxyethylene fatty acid ester, sorbitan fatty acid ester, polyoxyethylene sorbitan fatty acid ester, fatty acid alkylol amide, acetylene glycol, oxyethylene adduct of acetylene glycol, aliphatic alkanolamide, glycerin ester and sorbitan ester.

Examples of the cationic surfactant include tetraalkyl ammonium salt, alkyl amine salt, benzalkonium salt, alkylpyridium salt and imidazolium salt. Specific examples thereof include dihydroxyethyl stearylamine, 2-heptadecenyl-hydroxyethyl imidazoline, lauryldimethyl benzyl ammonium chloride, cetylpyridinium chloride and stearamide methylpyridinium chloride. Additionally, a silicone surfactant such as polysiloxane oxyethylene adduct; a fluorinated surfactant such as perfluoroalkyl carboxylate, perfluoroalkyl sulfonate and/or oxyethylene perfluoroalkyl ether; a biosurfactant such as spiculisporic acid, rhamnolipid and/or lysolecithin can be used.

In general, the solubilizing group of a colorant is often anionic, and a nonionic surfactant or an anionic surfactant is preferable in view of dispersion stability of the colorant. Acetylene glycol, oxyethylene adduct of acetylene glycol and polyoxyethylene alkyl ether are preferable in view of permeability control.

The amount of the surfactant contained in the ink is preferably less than about 10% by mass, more preferably in the range of about 0.01 to about 5% by mass, and still more preferably in the range of about 0.01 to about 3% by mass. A sufficient optical density may not be obtained when the amount added is 10% by mass or more.

In the invention, in order to control characteristics, for example, to improve ink ejecting properties, the ink may contain a cellulose derivative such as polyethylene imine, polyamines, polyvinylpyrrolidone, polyethylene glycol, ethylcellulose, and/or carboxymethylcellulose; a polysaccharide and/or a derivative thereof; a water-soluble polymer; a polymer emulsion such as an acrylic polymer emulsion, and/or a polyurethane emulsion; cyclodextrin; a macrocyclic amine; dendrimer; a crown ether; urea and/or a derivative thereof; and/or acetamide.

Various additives used for preparing an ink set other than the above materials can be used in combination in the invention as long as they do not adversely affect the effect of the invention. Examples of the additives which can be used in combination include an antioxidant, a fungicide, a viscosity controlling agent, a conductive agent, and an ultraviolet ray absorbent.

Next, the ink jet recording method of the invention will be described. The ink jet recording method uses the above ink set including an ink and a liquid composition. The ink contains: water; a colorant; a water-soluble organic solvent; polyvalent metal ions; and compound (A) which is intrinsically capable of substantially inactivating the polyvalent metal ions. The pH of the ink is within a range in which compound (A) keeps the polyvalent metal ions substantially in an inactive state. The liquid composition has a pH in which the polyvalent metal ions in the ink can be substantially activated. The ink and the liquid composition are applied onto a recording medium in positions in contact with each other, and images of high quality are thereby formed.

In the ink jet recording method of the invention, it is preferable that the liquid composition is first applied to the surface of the recording medium and that the ink is then applied.

The mass of one drop of the ink at the time of application of the ink and the liquid is preferably in the range of about 1 to about 40 ng, and more preferably in the range of about 1 to about 20 ng. The amount of one drop of the liquid composition is preferably in the range of about 1 to about 30 ng, and more preferably in the range of about 1 to about 10 ng. It is preferable that the amount of one droplet of the ink is larger than the amount of one droplet of the liquid composition.

The ink jet recording method of the invention can be conducted in a recording apparatus equipped with a heater to help an ink be fixed on paper, and a recording apparatus which is equipped with an intermediate transfer mechanism and in which an ink is applied to the intermediate transfer member and then transferred to a recording medium such as paper as well as an ordinary ink jet recording apparatus.

In the case of the liquid composition not containing a colorant, the ink may be applied to a recording medium after the liquid composition has been applied to the recording medium It is preferable to use a thermal ink jet method or a piezo ink jet method as a method for applying the ink and the liquid composition onto the recording medium.

As described above, the ink set for ink jet of the invention includes at least two liquids. Both these liquids excel in stability, and the influence of the ink set to the metallic member of a recording apparatus is suppressed. After the two liquids have been applied onto a recording medium, the colorant particles contained in the ink promptly aggregate at the interface between the liquids to form an image, and thereby the formed image has a sufficient optical density and has no bleeding between colors. In addition, the ink set for ink jet of the invention is stable in a recording apparatus, and has sufficient ejection stability. The ink set of the invention has a wide range of application.

EXAMPLES

Hereinbelow, the invention will be described in more detail by way of Examples, but the invention is not limited to the following Examples.

Inks prepared by the following method for dispersing a pigment and the following method for preparing an ink are combined to manufacture ink sets of Examples 1 to 4 and Comparative Examples 1 to 3.

Method for Dispersing Pigment

The dispersion liquid of a pigment self-dispersible in water is centrifuged with a centrifugal separator at 8000 rpm for 30 minutes. The residual portion (20% by mass of the total amount of the dispersion) is removed, and the remaining liquid is used as a pigment dispersion liquid.

Method 1 for Preparing Ink

A predetermined amount of a pH controlling material is added to deionized water. A predetermined amount of a polyvalent metal compound is added to the resultant mixture. Further, predetermined amounts of a colorant, a water-soluble organic solvent, a surfactant and the like are added to the resultant, and the resulting mixture is stirred. When the resulting mixture is black, the mixture is filtered by using a filter having a pore size of 1 μm. When the resulting mixture has a color other than black, the mixture is filtered by using a filter having a pore size of 0.45 μm. Thus, inks described later are obtained.

Method 2 for Preparing Ink

Predetermined amounts of a water-soluble organic solvent, a surfactant, deionized water and the like are added to an appropriate amount of a colorant, and the resultant mixture is stirred. When the mixture is black, the mixture is filtered by using a filter having a pore size of 1 μm. When the mixture has a color other than black, the mixture is filtered by using a filter having a pore size of 0.45 μm. Thus, inks described later are obtained.

Method for Preparing Liquid Composition

Predetermined amounts of a pH controlling material, deionized water and the like are mixed with each other. The resultant liquid is stirred and filtered with a filter having a pore size of 0.45 μm to obtain a liquid composition.

Black Ink 1

An ink of the following composition is obtained in accordance with the above method for dispersing a pigment and the above method 1 for preparing an ink.

| | |
|---|---|
| Cabojet 300 ™ (manufactured by Cabot Corporation) | 3.5% by mass |
| diethylene glycol | 15% by mass |
| propylene glycol | 5% by mass |
| Surfynol 465 ™ (a nonionic surfactant, manufactured by Nisshin Chemicals Co., Ltd.) | 2% by mass |
| urea | 5 mass % |
| taurine | 1.4% by mass |
| NaOH | 0.2% by mass |
| Mg-EDTA (a reaction product of polyvalent metal ions ($Mg^{2+}$) and compound (A)) | 2% by mass |
| deionized water | the remainder |

The pH of black ink 1 is 9.4.

Black Ink 2

An ink of the following composition is obtained in accordance with the above method for dispersing a pigment and the above method 1 for preparing an ink.

| | |
|---|---|
| Cabojet 300 ™ (manufactured by Cabot Corporation) | 3.5% by mass |
| diethylene glycol | 15% by mass |

-continued

| | |
|---|---|
| propylene glycol | 5% by mass |
| Surfynol 465 ™ | 2% by mass |
| urea | 5% by mass |
| taurine | 1.4% by mass |
| NaOH | 0.2% by mass |
| Ca-EDTA (a reaction product of polyvalent metal ions ($Mg^{2+}$) and compound (A)) | 2% by mass |
| deionized water | the remainder |

The pH of black ink 2 is 9.1.

Black Ink 3

An ink of the following composition is obtained in accordance with the above method for dispersing a pigment and the above method 2 for preparing an ink.

| | |
|---|---|
| Cabojet 300 ™ (manufactured by Cabot Corporation) | 3.5% by mass |
| diethylene glycol | 15% by mass |
| propylene glycol | 5% by mass |
| Surfynol 465 ™ | 2% by mass |
| urea | 5% by mass |
| taurine | 1.4% by mass |
| NaOH | 0.2% by mass |
| deionized water | the remainder |

The pH of black ink 3 is 9.0.

Cyan Ink 1

An ink of the following composition is obtained in accordance with the above method 1 for preparing an ink.

| | |
|---|---|
| a self-dispersible pigment (manufactured by Cabot Corporation) | 3.5% by mass |
| diethylene glycol | 20% by mass |
| diethylene glycol-mono-butyl ether | 5% by mass |
| Surfynol 465 ™ | 1% by mass |
| urea | 5% by mass |
| taurine | 1.4% by mass |
| NaOH | 0.2% by mass |
| Mg-EDTA (a reaction product of polyvalent metal ions ($Mg^{2+}$) and compound (A)) | 2% by mass |
| deionized water | the remainder |

The pH of cyan ink 1 is 9.3.

Cyan Ink 2

An ink of the following composition is obtained in accordance with the above method 2 for preparing an ink.

| | |
|---|---|
| C. I. Direct Blue 199 | 3% by mass |
| diethylene glycol | 20% by mass |
| diethylene glycol-mono-butyl ether | 5% by mass |
| Surfynol 465 ™ | 1% by mass |
| potassium hydrogen phthalate | 5% by mass |
| 1 N-hydrochloric acid aqueous solution | 5% by mass |
| deionized water | the remainder |

The pH of cyan ink 2 is 4.1.

Cyan Ink 3

An ink of the following composition is obtained in accordance with the above method 2 for preparing an ink.

| | |
|---|---|
| C. I. Direct Blue 199 | 3% by mass |
| diethylene glycol | 20% by mass |
| diethylene glycol-mono-butyl ether | 5% by mass |
| Surfynol 465 ™ | 1% by mass |
| deionized water | the remainder |

The pH of cyan ink 3 is 7.6.

Magenta Ink 1

An ink of the following composition is obtained in accordance with the above method 1 for preparing an ink.

| | |
|---|---|
| a self-dispersible pigment (manufactured by Cabot Corporation) | 3.5% by mass |
| diethylene glycol | 20% by mass |
| diethylene glycol-mono-butyl ether | 5% by mass |
| Surfynol 465 ™ | 1% by mass |
| urea | 5% by mass |
| taurine | 1.4% by mass |
| NaOH | 0.2% by mass |
| Mg-EDTA (a reaction product of polyvalent metal ions ($Mg^{2+}$) and compound (A)) | 2% by mass |
| deionized water | the remainder |

The pH of magenta ink 1 is 9.2.

Magenta Ink 2

An ink of the following composition is obtained in accordance with the above method 2 for preparing an ink.

| | |
|---|---|
| M-377 ™ (manufactured by Ilford Company) | 3% by mass |
| diethylene glycol | 20% by mass |
| diethylene glycol-mono-butyl ether | 5% by mass |
| Surfynol 465 ™ | 1% by mass |
| potassium hydrogen phthalate | 3% by mass |
| NaOH | 0.005% by mass |
| deionized water | the remainder |

The pH of magenta ink 2 is 4.5.

Magenta Ink 3

An ink of the following composition is obtained in accordance with the above method 2 for preparing an ink.

| | |
|---|---|
| M-377 ™ (manufactured by Ilford company) | 3% by mass |
| diethylene glycol | 20% by mass |
| diethylene glycol-mono-butyl ether | 5% by mass |
| Surfynol 465 ™ | 1% by mass |
| deionized water | the remainder |

The pH of magenta ink 3 is 7.4.

Yellow Ink 1

An ink of the following composition is obtained in accordance with the above method 1 for preparing an ink.

| | |
|---|---|
| a self-dispersible pigment (manufactured by Cabot Corporation) | 3.5% by mass |
| diethylene glycol | 20% by mass |
| diethylene glycol-mono-butyl ether | 5% by mass |
| Surfynol 465 ™ | 1% by mass |
| urea | 5% by mass |
| taurine | 1.4% by mass |
| NaOH | 0.2% by mass |
| Mg-EDTA (a reaction product of polyvalent metal ions ($Mg^{2+}$) and compound (A)) | 2% by mass |
| deionized water | the remainder |

The pH of yellow ink 1 is 9.3.

Yellow Ink 2

An ink of the following composition is obtained in accordance with the above method 2 for preparing an ink.

| | |
|---|---|
| C. I. Direct Yellow 132 | 2% by mass |
| diethylene glycol | 20% by mass |
| diethylene glycol-mono-butyl ether | 5% by mass |
| Surfynol 465 ™ | 1% by mass |
| potassium hydrogen phthalate | 3% by mass |
| NaOH | 0.005% by mass |
| deionized water | the remainder |

The pH of yellow ink 2 is 4.4.

Yellow Ink 3

An ink of the following composition is obtained in accordance with the above method 2 for preparing an ink.

| | |
|---|---|
| C. I. Direct Yellow 132 | 2% by mass |
| diethylene glycol | 20% by mass |
| diethylene glycol-mono-butyl ether | 5% by mass |
| Surfynol 465 ™ | 1% by mass |
| deionized water | the remainder |

The pH of yellow ink 3 is 7.5.

Liquid Composition

A processing liquid of the following composition is obtained in accordance with the above method for preparing a liquid composition.

| | |
|---|---|
| potassium hydrogen phthalate | 10% by mass |
| NaOH | 0.05% by mass |
| diethylene glycol | 10% by mass |
| Surfynol 465 ™ | 1% by mass |
| deionized water | the remainder |

The pH of the liquid composition is 4.1.

The pH of each ink and the pH of the processing liquid are measured by using a pH meter (manufactured by Horiba, Ltd.) at 20° C. and 50% RH.

Examples 1 to 4 and Comparative Examples 1 to 3

As shown in Tables 1 to 2, the inks are combined to prepare ink sets. Further, each ink set is set in an ink jet recording apparatus shown in Table 1, and images are printed on FX-L paper (manufactured by Fuji Xerox Co., Ltd.) with the ink jet recording apparatus. The printed images are used for image evaluation described later.

In Examples 3 and 4, cyan ink 2, magenta ink 2 and yellow ink 2, pHs of which are in the range of 4.0 to 7.0, are used as liquid compositions (described as "processing liquid" in Tables 1 and 2) having a pH in which the polyvalent metal ions in black inks 1 and 2 can activate. These examples are embodiments in which the liquid composition of the invention serves as another ink containing a colorant.

TABLE 1

| | Ink/Processing liquid | pH | Overlapping printing density (%) | Printer | Optical density | Color spreading in images | Bleeding between colors | Ejection stability |
|---|---|---|---|---|---|---|---|---|
| Example 1 | Black ink 1 | 9.4 | 35 | 1 | ○ | ○ | ○ | ○ |
| | Cyan ink 1 | 9.3 | | | | | | |
| | Magenta ink 1 | 9.2 | | | | | | |
| | Yellow ink 1 | 9.3 | | | | | | |
| | Liquid composition | 4.1 | | | | | | |
| Example 2 | Black ink 2 | 9.1 | 35 | 1 | ○ | ○ | ○ | Δ |
| | Cyan ink 1 | 9.3 | | | | | | |
| | Magenta ink 1 | 9.2 | | | | | | |
| | Yellow ink 1 | 9.3 | | | | | | |
| | Liquid composition | 4.1 | | | | | | |
| Example 3 | Black ink 1 | 9.4 | 50 | 2 | ○ | ○ | ○ | ○ |
| | Cyan ink 2 | 4.1 | | | | | | |
| | Magenta ink 2 | 4.5 | | | | | | |
| | Yellow ink 2 | 4.4 | | | | | | |
| Example 4 | Black ink 2 | 9.1 | 50 | 2 | ○ | ○ | ○ | Δ |
| | Cyan ink 2 | 4.1 | | | | | | |
| | Magenta ink 2 | 4.5 | | | | | | |
| | Yellow ink 2 | 4.4 | | | | | | |

TABLE 2

| | Ink/Processing liquid | PH | Overlapping printing density (%) | Printer | Optical density | Color spreading in images | Bleeding between colors | Ejection stability |
|---|---|---|---|---|---|---|---|---|
| Comparative Example 1 | Black ink 3 | 9.0 | 35 | 1 | X | Δ | Δ | Δ |
| | Cyan ink 2 | 4.1 | | | | | | |
| | Magenta ink 2 | 4.5 | | | | | | |
| | Yellow ink 2 | 4.4 | | | | | | |
| | Liquid composition | 4.1 | | | | | | |
| Comparative Example 2 | Black ink 3 | 9.0 | 50 | 2 | Δ | X | X | ○ |
| | Cyan ink 1 | 9.3 | | | | | | |
| | Magenta ink 1 | 9.2 | | | | | | |
| | Yellow ink 1 | 9.3 | | | | | | |
| Comparative Example 3 | Black ink 1 | 9.4 | 50 | 2 | Δ | X | X | Δ |
| | Cyan ink 3 | 7.6 | | | | | | |
| | Magenta ink 3 | 7.4 | | | | | | |
| | Yellow ink 3 | 7.5 | | | | | | |

In Tables 1 and 2, overlapping printing density (%) shows a ratio of the amount of the liquid composition or color ink printed on the printing region of a black ink to the amount of the liquid composition or color ink printed at the time of solid printing. When the liquid composition of the invention is used, the overlapping printing density shows the amount of the liquid composition printed. When a liquid composition is not used, the overlapping printing density shows the total amount of the color inks printed. The use percentages of the three-color inks are the same. The ink jet recording apparatuses (described as a printer in Tables 1 and 2) used herein are prototypes, and are designed in accordance with a specification shown in Table 3.

TABLE 3

| | | Ink jet recording apparatus | |
|---|---|---|---|
| | | 1 | 2 |
| | | Printing method | |
| | | Thermal ink jet method | Thermal ink jet method |
| Droplet amount | Black ink | 38 ng | 15 ng |
| | Color Ink/Processing liquid | 20 ng | 7 ng |
| Applied pulse | | Printing with plural pulses | Printing with single pulse |
| | | Pre-pulse width: 0.75 μS Main pulse: 2.0 μS | Pulse width: 2.75 μS |

Evaluation of Ink Performance

Optical Density

A solid image is printed on FX-L paper (plain paper manufactured by Fuji Xerox Co., Ltd.) and then left for 24 hours. Thereafter, optical densities at arbitrary five positions of the image are measured by using an optical densitometer X-Rite MODEL404™ (manufactured by X-Rite Incorporated), and the average value is obtained.

The average values are evaluated as follows.

A black solid image is evaluated in accordance with the following evaluation standard.

○: 1.3 or more
Δ: 1.2 or more and less than 1.3
×: less than 1.2.

A cyan, magenta, or yellow solid image is evaluated in accordance with the following evaluation standard.

○: 1.0 or more
Δ: 0.8 or more and less than 1.0
×: less than 0.8.

Color Spreading in Images

A character pattern image is printed on FX-L paper (plain paper manufactured by Fuji Xerox Co., Ltd.) and is left for 24 hours. The image is then compared with predetermined criteria samples having actual printing pattern images with various levels of color spreading, ranging from images with little color spreading to images with much color spreading, as ranked by evaluators. The degree of color spreading in images of each ink set is sensorily evaluated in accordance with the following evaluation standard.

○: Some Color spreading in images is generated.
Δ: Color spreading in images is generated at an acceptable level.
×: Color spreading in images is at a conspicuously unacceptable level.

Bleeding Between Colors

A printing pattern image in which a black solid image, a cyan solid image, a magenta solid image and a yellow solid image are adjacent to each other is printed on FX-L paper (plain paper manufactured by Fuji Xerox Co., Ltd.) and is left for 24 hours. The image is then compared with predetermined criteria samples having actual printing pattern images with various levels of bleeding between colors ranging from little bleeding to much bleeding, as ranked by evaluators. The degree of bleeding between colors of each ink set is sensorily evaluated in accordance with the following evaluation standard.

○: Some bleeding between colors is generated.
Δ: Bleeding between colors is generated at an acceptable level.
×: Bleeding between colors is at a conspicuously unacceptable level.

Ejection Stability

Solid images of respective colors are continuously printed on FX-L paper (plain paper manufactured by Fuji Xerox Co., Ltd.). A visual check is made to determine whether each image has a missing portion, and each ink set is sensorily evaluated in accordance with the following evaluation standard.

○: The solid image has no missing portion, and is uniform.
Δ: At least one small missing portion exists in the solid image.

×: At least one large missing portion exists in the solid image.

The evaluation results are shown in Tables 1 and 2.

As is apparent from Tables 1 and 2, it is found that images having a high image density and excellent image quality without color spreading in images and bleeding between colors can be obtained in Examples 1 to 4 which use an ink set for ink jet recording of the invention. Also, it is found that the ink sets of the invention have superior ejection stability when the ink sets are set in any recording apparatus. On the other hand, an image having an insufficient optical density is obtained in the case of the ink set of Comparative Example 1 which does not contain polyvalent metal ions and compound (A). Color spreading in images and bleeding between colors are remarkable in Comparative Examples 2 and 3 which use no liquid composition having a low pH in combination with an ink.

What is claimed is:

1. An ink set for ink jet recording comprising:
   an ink which contains: water; a colorant; a water-soluble organic solvent; polyvalent metal ions; and compound (A) which is intrinsically capable of substantially inactivating the polyvalent metal ions, wherein the pH of the ink is within a range in which compound (A) keeps the polyvalent metal ions substantially in an inactive state, and
   a liquid composition of a pH in which the polyvalent metal ions in the ink can be substantially activated; wherein compound (A) is a compound which can form a complex being formed by the polyvalent metal ions, and wherein, as a result of a complex compound being formed by the polyvalent metal ions and compound (A) in the ink, the polyvalent metal ions are substantially kept in an inactive state.

2. The ink set for ink jet recording of claim 1, wherein the pH of the ink is in a range of 8.0 to 12.0.

3. The ink set for ink jet recording of claim 1, wherein the pH of the liquid composition is in a range of 4.0 to 7.0.

4. The ink set for ink jet of claim 1, wherein compound (A) is a compound which can form a complex compound with the polyvalent metal ions.

5. The ink set for ink jet recording of claim 1, wherein the colorant of the ink is a pigment.

6. The ink set for ink jet recording of claim 1, wherein the liquid composition is another ink containing a colorant.

7. The ink set for ink jet recording of claim 1, wherein the polyvalent metal ions are $M^{m+}$ and compound (A) has a reaction site $Y^{a-}$ reacting with the polyvalent metal ions, in which m is 2 to 3 and a is 1 to 6, and the polyvalent metal ions and compound (A) are dissolved in the ink in a state of a complex compound $MY^{m-ax}$.

8. The ink set for ink jet recording of claim 7, wherein $Y^{a-}$ is selected from the group consisting of $Cl^-$, $CN^-$, $NO_3^-$, $SO_4^{2-}$, $NO_2^-$, $OH^-$, $CO_3^{2-}$ and $O^{2-}$.

9. The ink set for ink jet recording of claim 7, wherein $Y^{a-}$ has a structure represented by any one of the following formulae (1) to (13):

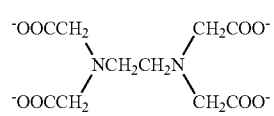

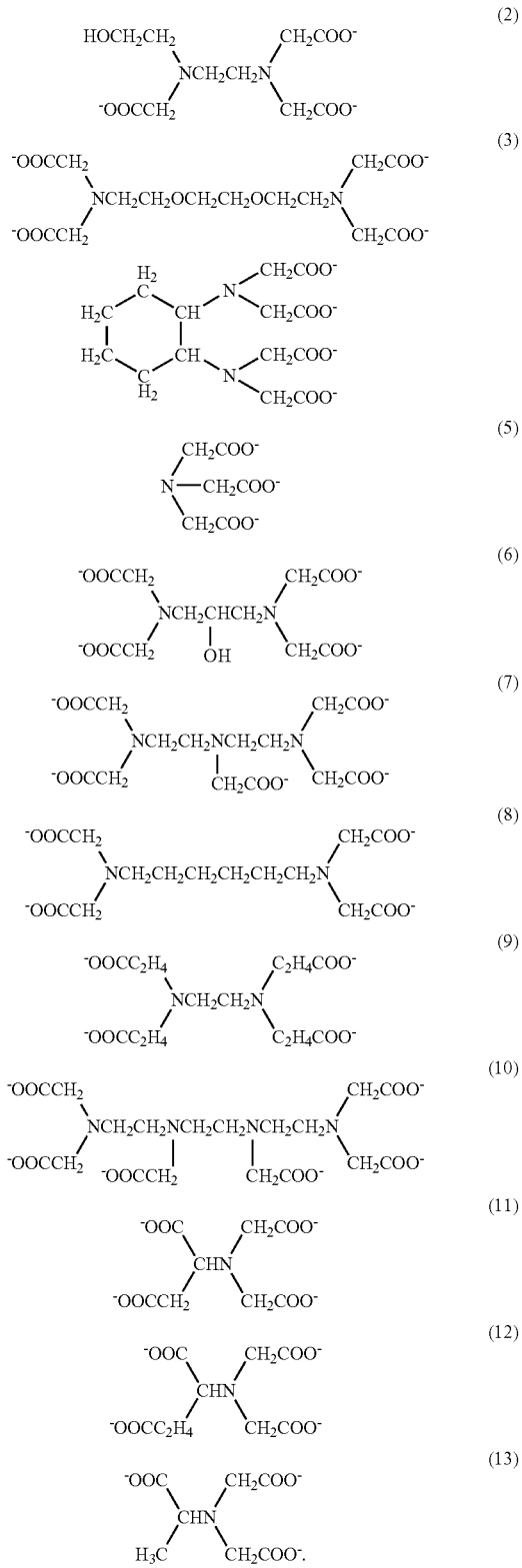

10. The ink set for ink jet recording of claim 1, wherein the polyvalent metal ions are selected from the group consisting of $Mg^{2+}$, $Ca^{2+}$, $Cu^{2+}$, $Co^{2+}$, $Zn^{2+}$, $Ni^{2+}$, $Fe^{2+}$, $La^{3+}$, $Nd^{3+}$, $Y^{3+}$ and $Al^{3+}$.

11. The ink set for ink jet recording of claim 1, wherein the polyvalent metal ions are $Mg^{2+}$, and the pH of the ink is in a range of 8.5 to 11.

12. The ink set for ink jet recording of claim 1, wherein the polyvalent metal ions are $Mg^{2+}$, and the pH of the ink is in a range of 9.0 to 10.5.

13. The ink set for ink jet recording of claim 1, wherein the polyvalent metal ions are $Ca^{2+}$, and the pH of the ink is in a range of 8.0 to 12.

14. The ink set for ink jet recording of claim 1, wherein the polyvalent metal ions are $Ca^{2+}$, and the pH of the ink is in a range of 8.5 to 11.

15. The ink set for ink jet recording of claim 1, wherein the pH of the liquid composition is in a range of 4.0 to 6.0.

16. An ink set for ink jet recording comprising:
    an ink which contains: water; a pigment which can be self-dispersed in water; a water-soluble organic solvent; polyvalent metal ions; and compound (A) having a reaction site reacting with the polyvalent metal ions, wherein the pH of the ink is in a range of 8.0 to 12.0, and a complex compound is formed by the polyvalent metal ions and the reaction site; and
    a liquid composition which can substantially activate the polyvalent metal ions in the ink and the pH of which liquid composition is in a range of 4.0 to 6.0;
    wherein compound (A) is a compound which can form a complex being formed by the polyvalent metal ions, and wherein, as a result of a complex compound being formed by the polyvalent metal ions and compound (A) in the ink, the polyvalent metal ions are substantially kept in an inactive state.

17. The ink set for ink jet recording of claim 16, wherein the liquid composition contains a colorant.

18. An ink jet recording method which uses an ink set comprising:
    an ink which contains: water; a colorant; a water-soluble organic solvent; polyvalent metal ions; and compound (A) which is intrinsically capable of substantially inactivating the polyvalent metal ions, wherein the pH of the ink is within a range in which compound (A) keeps the polyvalent metal ions substantially in an inactive state; and
    a liquid composition of a pH in which the polyvalent metal ions in the ink can be substantially activated,
    wherein the ink and the liquid composition are applied onto a recording medium in positions in contact with each other, and images are thereby formed; and
    wherein compound (A) is a compound which can form a complex being formed by the polyvalent metal ions, and wherein, as a result of a complex compound being formed by the polyvalent metal ions and compound (A) in the ink, the polyvalent metal ions are substantially kept in an inactive state.

19. The ink jet recording method of claim 18, wherein the ink is applied onto the recording medium after the liquid composition has been applied onto the recording medium.

* * * * *